United States Patent Office 3,677,690
Patented July 18, 1972

3,677,690
DYEING HUMAN HAIR WITH AQUEOUS SOLUTION OF INDAMINES
Gregoire Kalopissis, Paris, Andreé Bugaut, Boulogne-sur-Seine, and Françoise Estradier, Paris, France, assignors to Societe Anonyme dite: L'Oreal, Paris, France
No Drawing. Filed July 6, 1970, Ser. No. 52,739
Claims priority, application Luxembourg, July 17, 1969, 59,119
Int. Cl. D06p 3/04
U.S. Cl. 8—10
7 Claims

ABSTRACT OF THE DISCLOSURE

Indamines having the formula

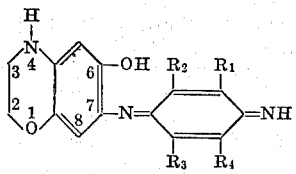

wherein $R_1$, $R_2$, $R_3$ and $R_4$ can be hydrogen, halogen, lower alkyl or lower alkoxy and are usefully employed in a dye composition for coloring keratinous fibers. Such compositions are aqueous solutions of the indamines and can be formulated with lower alkanols and film-forming cosmetic resins to produce hair setting lotions.

---

The present invention relates to a novel indamine and a process for preparing the same and to a novel cosmetic composition containing said indamine for dyeing keratinic fiber such as human hair. More specifically, the present invention relates to a method for preparing and a use of a novel indamine having the formula:

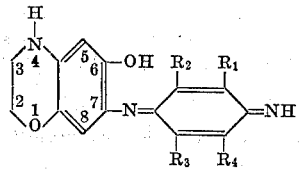

wherein $R_1$, $R_2$, $R_3$ and $R_4$ each represent hydrogen, halogen, lower alkyl having 1–4 carbon atoms and lower alkoxy containing from 1 to 4 carbon atoms.

The novel indamines of this invention can be prepared by condensing a paraphenylenediamine having the formula:

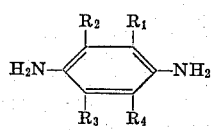

wherein $R_1$, $R_2$, $R_3$ and $R_4$ have the meanings indicated above, on hydroxy-6 phenomorpholine having the formula:

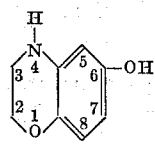

This condensation reaction can be performed in an aqueous or aqueous acetonic medium having a pH equal to or greater than 8 and as high as 12, in the presence of an oxidizing agent, and at a temperature between 0 and 50° C.

The oxidizing agent used in this reaction can be hydrogen peroxide or potassium persulfate. When the oxidizing agent is hydrogen peroxide, it is present generally in amounts of about 5–20 times the stoichiometric requirement, and when the oxidizing agent employed is potassium persulfate, it is present in amounts of about 1–2 times the stoichiometric requirements. The reaction medium can be made alkaline, preferably by the addition thereto of ammonia, although other alkalinizing agents such as NaOH and KOH can also be employed.

The paraphenylenediamine used in the preparation of the indamines according to the present invention can be, for example, paraphenylenediamine, paratoluylenediamine, diamino-2,5 anisole, diamino-2,5 chlorobenzene, methoxy-2 methyl-5 paraphenylenediamine, dimethyl-2,6 methoxy-paraphenylenediamine and diamino-1,4 durene. The mole ratio of paraphenylene diamine to hydroxy-6-phenomorpholine in the condensation reaction can vary between about 3:1 to 0.5:1 and preferably between 1:1 to 2:1.

The novel indamines of the present invention constitute dyes that have a particularly interesting application in dyeing keratinous fibers, particularly human hair.

Thus, an object of the present invention is the provision of a novel coloring agent useful in a dyeing composition for keratinous fibers, characterized by the fact that said coloring agent comprises at least one indamine defined above.

When the dyeing composition of the present invention contains as the sole dyeing agent, one or more indamines described above, the coloration imparted to the keratinous fibers by its use varies from green to blond.

However, the dye composition of this invention can also include, in addition to the indamines defined above other dyes ordinarily used for dyeing hair. Representative of such other dyes are, for example, aniline or anthroquinone dyes. Indoanilines, indophenols or indamines other than those defined above.

The novel dye compositions of this invention comprise an aqueous solution of the said indamine, which dye compositions can be prepared by dissolving in an aqueous medium one or more of said indamines and, if desired, one or more conventionally employed dyes useful in the coloration of keratin fibers. Additionally, however, the dye composition of this invention can also contain thickeners and thus be in the form of a cream or gel.

Furthermore, the dye composition of the present invention can also contain various conventional ingredients usually employed in cosmetic preparations, for example, wetting agents, dispersing agents, swelling agents, penetration agents, softeners or perfumes. It has also been found that the dye composition of this invention can be in the form of a sprayable aerosol, packaged in a conventional aerosol bomb or can.

The pH of the dyeing compositions of this invention can vary within broad limits and will range generally between about 5–11, and preferably between 7–11. The amount of indamine present in the aqueous solution comprising the dye composition of this invention can vary, for instance, depending on, for instance, the particular indamines present, the color desired as well as the color of the hair to be dyed. Thus an amount of the indamine effective to produce the desired coloration is employed. Generally this amount ranges between about 0.02 to 0.25 weight percent of the total aqueous solution.

Dyeing of keratinous fibers, in particular human hair, with the dyeing composition of this invention is performed in accordance with conventional dyeing techniques, for instance, by applying the said composition to the fibers to be dyed, permitting the composition to remain in contact with said fibers for a period of about 5–30 minutes and thereafter, rinsing and, if desired, washing, and drying the fibers.

The novel indamines of this invention can also be employed to provide a novel hair setting lotion comprising an admixture of at least one of said indamines and a dilute alcohol solution of at least one cosmetic resin.

Cosmetic resins usefully employed to produce said hair setting lotions include, for instance, polyvinylpyrrolidone having a molecular weight ranging from about 10,000 to 700,000, copolymers of crotonic acid-vinyl acetate, copolymers of vinylpyrrolidone-vinyl acetate wherein the ratio of PVP to PVA can range between, for instance, 50–70:50–30, copolymers of maleic anhydride-butylvinyl ether and the like. These resins are generally used in the proportion of 1 to 3% by weight of the total composition. Further the indamine content of said hair setting lotion usually ranges between about 0.02 to 0.25 weight percent of the total composition.

The alcohols suitable for making said hair-setting lotions are lower alkanols, preferably, ethanol and isopropanol. These alcohols are used in a proportion of 20 to 50% by weight of the total composition.

The hair-setting lotion according to the invention is employed in a conventional manner by applying the same to previously washed and rinsed wet hair, followed by rolling the treated hair on curlers and thereafter drying it.

The following examples are given to illustrate the present invention. The temperatures indicated in the examples are expressed in degrees Celsius and unless otherwise specifically stated, all parts and percentages are by weight.

EXAMPLE 1

N-[(hydroxy-6 oxa-1 aza-4 tetrahydro-1,2,3,4)naphthyl-7]methyl-2 benzoquinonediimine is prepared according to the following reaction:

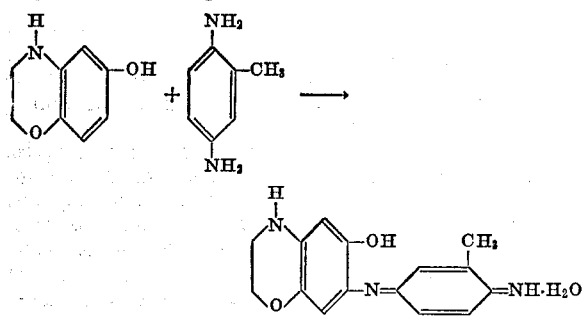

0.06 mole (9.06 g.) of hydroxy-6 phenomorpholine is dissolved in 600 cm.³ of water. To this solution there are added 180 cm.³ of ammonia at 22° Bé, 750 cm.³ of 20-volume hydrogen peroxide and a solution of 0.12 mole (14.64 g.) of paratoluylenediamine in 600 cm.³ of water. The resulting reaction mixture is allowed to stand for four hours at ambient temperature and thereafter 6.5 g. of crystallized indamine, identified above, in monohydrate form is isolated by filtering off the reaction mass. After recrystallization of the indamine crystals in a dimethylformamide-water mixture, the resulting product exhibited a melting point of 258°.

*Analysis.*—Calculated for $C_{15}H_{15}N_3O_2 \cdot H_2O$ (percent): C, 62.71; H, 5.92; N, 14.63. Found (percent): C, 61.81, 62.05; H, 5.98, 6.02; N, 14.59, 14.79.

EXAMPLE 2

N-[(hydroxy-6 oxa-1 aza-4 tetrahydro-1,2,3,4)naphthyl-7]methoxy-3 benzoquinonediimine is prepared in accordance with the following reaction:

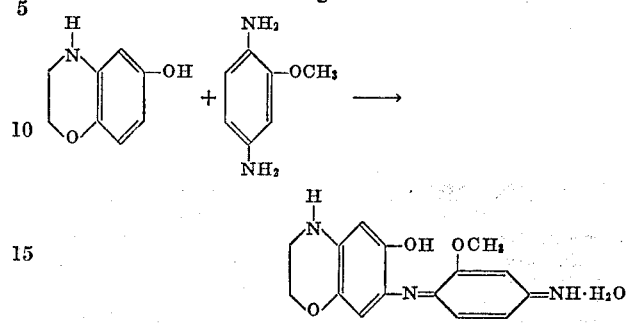

0.025 mole (5.27 g.) of methoxyparaphenylenediamine dichlorhydrate is dissolved in 200 cm.³ of water. The pH of this solution is then adjusted to a pH of 8 by adding ammonia thereto. To this alkaline solution there is immediately added 0.02 mole (3.02 g.) of hydroxy-6-phenomorpholine, previously dissolved in 200 cm.³ of water. To this resulting mixture there are added 90 cm.³ of ammonia at 22° Bé. and 260 cm.³ of 20-volume hydrogen peroxide. This resulting reaction mixture is then permitted to stand for two hours at ambient temperature. The reaction mixture is then filtered off and there is obtained 3.8 g. of crystallized indamine in monohydrate form which, after washing with water and recrystallization in a dimethylformamide-water mixture, exhibits a melting point of 216°.

*Analysis.*—Calculated for $C_{15}H_{15}N_3O_3 \cdot H_2O$ (percent): C, 59.40; H, 5.61; N, 13.86. Found (percent): C, 58.88, 59.07; H, 5.54, 5.52; N, 13.80, 13.63.

EXAMPLE 3

N-[(hydroxy-6 oxa-1 aza-4 tetrahydro-1,2,3,4)naphthyl-7]methyl-2 methoxy-5 benzoquinone diimine is prepared in accordance with the following reaction:

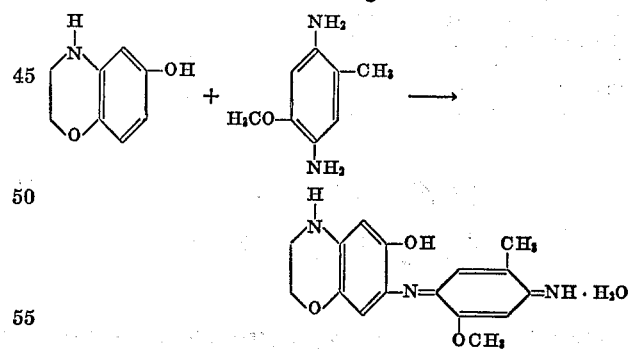

0.03 mole (4.53 g.) of hydroxy-6 phenomorpholine is dissolved in 300 cm.³ of water. To this solution there are added 90 cm.³ ammonia at 22° Bé., 350 cm.³ of 20-volume hydrogen peroxide and 0.0375 mole (5.7 g.) of methyl-2 methoxy-5 paraphenylenediamine in a solution which is a mixture of 50 cm.³ of water and 300 cm.³ of acetone. The resulting reaction mixture is allowed to stand at ambient temperature for three hours. Then 8.1 g. of crystallized indamine in monohydrate form are isolated from the reaction mixture by filtering off the same. After recrystallization in a dimethylformamide-water mixture, the product exhibited a melting point of 226°.

Molecular weight found by potentiometric dosing in acetic acid by perchloric acid: 323.

Molecular weight calculated for $C_{16}H_{17}N_3O_3 \cdot H_2O$: 317.

*Analysis.*—Calculated for $C_{16}H_{17}N_3O_3 \cdot H_2O$ (percent): N, 13.24. Found (percent): N, 13.38, 13.30.

EXAMPLE 4

N-[(hydroxy-6 oxa-1 aza-4 tetrahydro-1,2,3,4)naphthyl-7] dimethyl-2,6 methoxy-5 benzoquinonediimine is prepared in accordance with the following reaction:

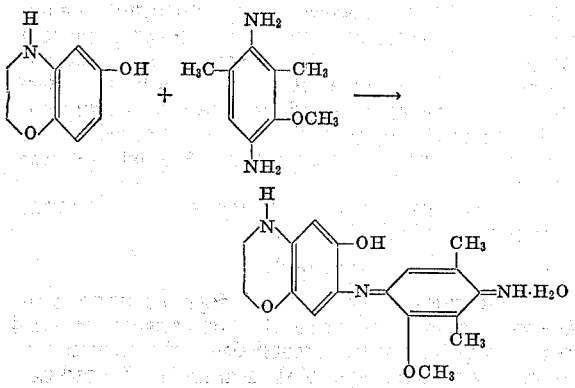

0.02 mole (3.02 g.) of hydroxy-6 phenomorpholine is dissolved in 200 cm.³ of water. To this solution there are added 0.025 mole (4.1 g.) of dimethyl-2,6 methoxy-5 paraphenylenediamine in solution in 200 cm.³ of water, 60 cm.³ of ammonia at 22° Bé. and 250 cm.³ of 20-volume hydrogen peroxide. The resulting reaction mixture is allowed to stand for two hours at ambient temperature and thereafter 3 g. of crystallized indamine in monohydrate form are isolated therefrom by filtering off the reaction mixture. After recrystallization in a dimethylformamide-water mixture, the product exhibited a melting point of 186°.

Molecular weight calculated for $C_{17}H_{19}N_3O_3 \cdot H_2O$: 331.

Molecular weight found by potentiometric dosing in acetic acid by perchloric acid: 333.

*Analysis.*—Calculated for $C_{17}H_{19}N_3O_3 \cdot H_2O$ (percent): N, 12.68. Found (percent): N, 12.63, 12.82.

EXAMPLE 5

N-[(hydroxy-6 oxa-1 aza-4 tetrahydro-1,2,3,4)naphthyl-7]duroquinone diimine is prepared in accordance with the following reaction:

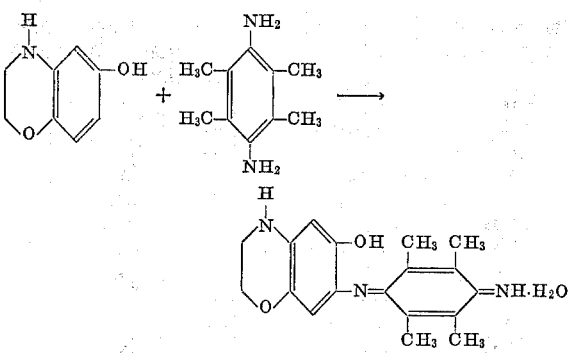

0.005 mole (0.75 g.) of hydroxy-6 phenomorpholine is dissolved in 50 cm.³ of water. To this solution there are added 15 cm³. of ammonia at 22° Bé, 0.01 mole (1.64 g.) of diamino-1,4 durene dissolved in a mixture of 30 cm.³ of water and 40 cm.³ of acetone, and finally 75 cm.³ of 20-volume hydrogen peroxide. This resulting reaction mixture is allowed to stand at ambient temperature for five hours. 0.5 g. of crystallized indamine identified above in monohydrate form, is isolated by filtering off the reaction mixture. After recrystallization in a dimethylformamide-water mixture, the said indamine exhibited a melting point of 290°.

Molecular weight calculated for $C_{18}H_{21}N_3O_2 \cdot H_2O$: 329.

Molecular weight found by potentiometric dosing in acetic acid by perchloric acid: 334.

*Analysis.*—Calculated for $C_{18}H_{21}N_3O_2 \cdot H_2O$ (percent): N, 13.07. Found (percent): N, 12.71, 12.80.

EXAMPLE 6

A dyeing composition, in accordance with this invention, is prepared as follows:

|   | G. |
|---|---|
| The indamine of Example 2 | 0.1 |
| Lauric alcohol oxyethylenated with 10.5 moles of ethylene oxide | 5 |
| Water sufficient for 100 g. | |

This dyeing composition solution is applied to 90% gray hair and left in contact therewith for 30 minutes. The hair is then rinsed and shampooed. A green gray shade is obtained.

EXAMPLE 7

A hair setting lotion, in accordance with the present invention, is prepared as follows:

|   | G. |
|---|---|
| Indamine of Example 2 | 0.1 |
| Crotonic acid-vinyl acetate copolymer (10%:90%, mol. wt. 45,000) | 2 |
| Ethanol—96° titer sufficient for 50°. | |
| Water sufficient for 100 g. | |

This hair setting lotion is applied to 100% white hair and imparts thereto a dull green hue.

EXAMPLE 8

A hair setting lotion is prepared as follows:

|   | G. |
|---|---|
| The indamine of Example 5 | 0.1 |
| Crotonic acid-vinyl acetate copolymer (10%:90%, mol. wt. 45,000) | 2 |
| Isopropanol—96° titer sufficient for 50°. | |
| Water sufficient for 100 g. | |

This hair setting lotion is applied to 100% white hair and imparts thereto a golden blond color.

EXAMPLE 9

A hair dye composition is prepared as follows:

|   | G. |
|---|---|
| The indamine of Example 4 | 0.2 |
| Butylglycol | 5 |
| Lauric alcohol oxyethylenated with 10.5 moles of ethylene oxide | 5 |
| Water sufficient for 100 g. | |

This hair dye composition is applied to 100% white hair and is permitted to remain in contact therewith for 30 minutes. Thereafter the hair is rinsed and shampooed and a lime coloring is imparted thereto.

EXAMPLE 10

A hair dye composition is prepared as follows:

|   | G. |
|---|---|
| The indamine of Example 4 | 0.1 |
| N[(amino - 4'methyl - 3')phenyl]amino-3 dimethyl-2,6 benzoquinoneimine | 0.1 |
| Ammonia sufficient for pH 10.5. | |
| Water sufficient for 100 g. | |

The hair dye composition is applied to white hair and permitted to remain in contact therewith for a period of about 30 minutes. The hair is then rinsed and shampooed and a clear chestnut coloring with slight violet glints is imparted thereto.

EXAMPLE 11

A hair setting lotion is prepared as follows:

|   | G. |
|---|---|
| The indamine of Example 3 | 0.2 |
| Crotonic acid-vinyl acetate copolymer (10%:90%, mol. wt. 50,000) | 2 |
| Ethanol—96° titer, sufficient for 50°. | |
| Water sufficient for 100 g. | |

This hair setting lotion is applied to bleached hair and imparts thereto a blond color with Cyprian green glints.

What is claimed is:

1. A process for dyeing human hair which comprises applying to said hair in an amount effective to dye the same an aqueous solution containing 0.02–0.25 percent by weight of a dye having the formula

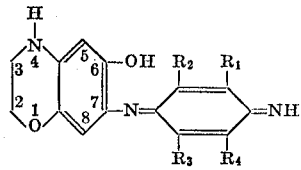

wherein $R_1$, $R_2$, $R_3$ and $R_4$ each, independently, represent a member selected from the group consisting of hydrogen, halogen, lower alkyl having 1–4 carbon atoms and lower alkoxy having 1–4 carbon atoms, said composition remaining in contact with said hair for a period ranging from about 5–30 minutes, rinsing said hair and drying said hair.

2. A composition for dyeing human hair comprising an aqueous solution of at least one compound having the formula

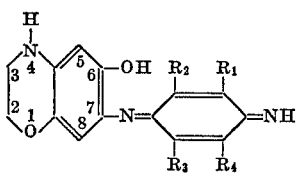

wherein $R_1$, $R_2$, $R_3$ and $R_4$ each independently represent a member selected from the group consisting of hydrogen, halogen, lower alkyl having 1–4 carbon atoms and lower alkoxy having 1–4 carbon atoms, said compound being present in an amount ranging between 0.02 to 0.25 percent by weight of the total composition.

3. The composition of claim 2 wherein the pH of said composition ranges between 5–11.

4. The composition of claim 3 wherein the pH ranges between 7–11.

5. The composition of claim 2 wherein the aqueous solution further contains a lower alkanol and a film forming resin in amounts of about 1–3 weight percent based on the weight of said composition.

6. The composition of claim 5 wherein the lower alkanol is selected from the group consisting of ethanol and isopropanol.

7. The composition of claim 5 wherein the lower alkanol is present in amounts ranging from about 20–50 percent by weight of said composition.

References Cited

UNITED STATES PATENTS 2,453,661   11/1948   Glass et al. _____ 96—56.1

GEORGE F. LESMES, Primary Examiner

P. C. IVES, Assistant Examiner

U.S. Cl. X.R.

8—79, 93, 85, 92; 260—244 B, 247.5 B